US012305867B2

(12) United States Patent
Balazs et al.

(10) Patent No.: US 12,305,867 B2
(45) Date of Patent: May 20, 2025

(54) SYSTEM AND METHOD FOR NEBULIZER FAILURE DETECTION

(71) Applicant: RESEARCH PRODUCTS CORPORATION, Madison, WI (US)

(72) Inventors: Nicholas J. Balazs, Madison, WI (US); Christopher Rushmore, Madison, WI (US); Aditya Rane, Madison, WI (US)

(73) Assignee: Research Products Corporation, Madison, WI (US)

( * ) Notice: Subject to any disclaimer, the term of this patent is extended or adjusted under 35 U.S.C. 154(b) by 0 days.

(21) Appl. No.: 17/697,770

(22) Filed: Mar. 17, 2022

(65) Prior Publication Data
US 2022/0299227 A1 Sep. 22, 2022

Related U.S. Application Data

(60) Provisional application No. 63/162,667, filed on Mar. 18, 2021.

(51) Int. Cl.
F24F 11/38 (2018.01)
B05B 12/00 (2018.01)
(Continued)

(52) U.S. Cl.
CPC ............ F24F 11/38 (2018.01); B05B 12/004 (2013.01); B05B 17/0653 (2013.01); F24F 6/12 (2013.01);
(Continued)

(58) Field of Classification Search
CPC ............. B05B 12/004; B05B 17/0653; B05B 2219/2614; F24F 11/38; F24F 6/12; F24F 11/52; F24F 11/56; F24F 11/63
See application file for complete search history.

(56) References Cited

U.S. PATENT DOCUMENTS 7,311,004 B2 * 12/2007 Giles ................... A01M 7/0096
239/176
8,679,691 B2 * 3/2014 Lang ................ H01M 8/04201
429/444
(Continued)

FOREIGN PATENT DOCUMENTS

EP 2837896 B1 * 12/2017 ................ F24F 3/14

OTHER PUBLICATIONS

Machine Translation for EP-2837896-B1, obtained Jan. 2025 (Year: 2025).*

Primary Examiner — Alicia M. Choi
Assistant Examiner — Vi N Tran
(74) Attorney, Agent, or Firm — Foley & Lardner LLP

(57) ABSTRACT

A humidifying system and method for identifying component failure in the humidifying system are disclosed. The system includes a nebulizer unit that creates a mist for humidifying the indoor space, a sensor that determines data regarding a characteristic of the nebulizer unit, and a controller coupled to the nebulizer unit and the sensor. The controller receives first data associated with operation of a nebulizer unit from the sensor, compares the first data associated with operation of the nebulizer unit to a threshold. In response to the first data associated with the operation of the nebulizer unit satisfying the threshold, the controller determines the existence of the failure state for the nebulizer unit and initiates a remediation action with respect to the nebulizer unit.

16 Claims, 9 Drawing Sheets

(51) Int. Cl.
*B05B 17/06* (2006.01)
*F24F 6/12* (2006.01)
*F24F 11/52* (2018.01)
*F24F 11/56* (2018.01)
*F24F 11/63* (2018.01)
*G05B 19/042* (2006.01)

(52) U.S. Cl.
CPC .............. *F24F 11/52* (2018.01); *F24F 11/56* (2018.01); *F24F 11/63* (2018.01); *G05B 19/042* (2013.01); *G05B 2219/2614* (2013.01)

(56) References Cited

U.S. PATENT DOCUMENTS

| | | | | |
|---|---|---|---|---|
| 8,807,131 | B1* | 8/2014 | Tunnell | A61M 15/0021 128/200.14 |
| 11,221,939 | B2* | 1/2022 | Degaonkar | G06F 11/3476 |
| 11,610,473 | B2* | 3/2023 | Finke | G16H 40/67 |
| 2008/0030102 | A1* | 2/2008 | Ohnishi | B41J 2/0451 310/317 |
| 2010/0224697 | A1* | 9/2010 | Modlin | B05B 17/0684 43/132.1 |
| 2012/0143073 | A1* | 6/2012 | Denyer | G16H 20/13 128/200.14 |
| 2012/0305661 | A1* | 12/2012 | Malchiondo | F24F 11/46 236/44 A |
| 2014/0338661 | A1* | 11/2014 | Leppard | B05B 12/08 128/200.16 |
| 2015/0021796 | A1* | 1/2015 | Peczalski | F24F 11/0008 261/128 |
| 2015/0276252 | A1* | 10/2015 | Iida | F24F 11/62 709/213 |
| 2016/0231721 | A1* | 8/2016 | Lakshmanan | G05B 19/042 |
| 2018/0093291 | A1* | 4/2018 | Benjamin | F24F 6/12 |
| 2019/0041075 | A1* | 2/2019 | Sarkar | F24F 11/62 |
| 2019/0182329 | A1* | 6/2019 | Moss | G06N 20/00 |
| 2019/0198307 | A1* | 6/2019 | Jones | H01J 49/0031 |
| 2020/0035642 | A1* | 1/2020 | Egusa | H01L 23/053 |
| 2020/0186626 | A1* | 6/2020 | Martin | H04L 69/18 |
| 2020/0330719 | A1* | 10/2020 | Segal | A61B 5/4833 |
| 2021/0178110 | A1* | 6/2021 | Barnes | A61M 16/202 |
| 2022/0375586 | A1* | 11/2022 | McDermott | A61M 5/1452 |

* cited by examiner

SYSTEM AND METHOD FOR NEBULIZER FAILURE DETECTION

CROSS-REFERENCE TO RELATED APPLICATIONS

The present application claims priority to U.S. Provisional Application No. 63/162,667, filed Mar. 18, 2021, which is incorporated by reference herein in its entirety.

BACKGROUND

The present disclosure relates generally to humidifying systems for increasing humidity of ambient air. More specifically, the disclosure relates to identification of nebulizer unit failure in a humidifier and various remediation efforts.

Humidifying systems are designed to provide humidified air in response to a call for humidity (e.g., from a humidistat, thermostat, portable user device, etc.), wherein upon receiving the call, the humidifier typically turns on both its fan and water feed valve simultaneously. Humidifying systems generally include one or more nebulizer units that convert water to a mist to increase humidity. Like many movable components, these nebulizer units may be vulnerable to failure. Traditionally, determining failure of such units has required visual inspection of the units during operation, which can be hazardous (to the individual inspecting the units as well as the components of the humidifier), onerous, inefficient, and unreliable.

Accordingly, it would be advantageous to provide a humidifying system have a safer, more reliable, more efficient, and easier manner of detecting nebulizer unit failure.

SUMMARY OF THE INVENTION

According to one aspect of the present disclosure, a system for humidifying an indoor space includes a nebulizer unit configured to create a mist for humidifying the indoor space, an air circulation unit configured to provide air to the nebulizer unit, and a water supply component configured to control water flow from a water source to the nebulizer unit. The system further includes a sensor configured to determine data regarding a characteristic of the nebulizer unit and a controller operably coupled to the nebulizer unit and the sensor. The controller is configured to receive first data associated with operation of a nebulizer unit from the sensor and compare the first data associated with operation of the nebulizer unit to a threshold, wherein the threshold is indicative of a failure state of the nebulizer unit. The controller is further configured to, in response to the first data associated with the operation of the nebulizer unit satisfying the threshold, determine existence of the failure state for the nebulizer unit and, in response to determination of the existence of the failure state, initiate a remediation action with respect to the nebulizer unit.

According to another aspect of the present disclosure, a method for detecting failure of components of a humidifying system includes receiving, by a first sensor, first data associated with operation of a nebulizer and comparing, by a controller, the first data associated with operation of the nebulizer to a threshold, wherein the threshold is indicative of a failure state of the nebulizer. The method further includes, in response to the first data associated with the operation of the nebulizer satisfying the threshold, determining, by the controller, existence of the failure state for the nebulizer and, in response to determination of the existence of the failure state, initiating, by the controller, a remediation action with respect to the nebulizer.

In another aspect of the present disclosure, a non-transitory computer-readable medium having instructions stored thereon that, upon execution by a computing device, cause the computing device to perform various operations including receiving, from a first sensor, first data associated with operation of a nebulizer and comparing the first data associated with operation of the nebulizer to a threshold, wherein the threshold is indicative of a failure state of the nebulizer. The operations further includes, in response to the first data associated with the operation of the nebulizer satisfying the threshold, determining existence of the failure state for the nebulizer and, in response to determination of the existence of the failure state, initiating a remediation action with respect to the nebulizer.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

A clear conception of the advantages and features constituting the present disclosure, and of the construction and operation of typical mechanisms provided with the present disclosure, will become more readily apparent by referring to the exemplary, and therefore non-limiting, embodiments illustrated in the drawings accompanying and forming a part of this specification, wherein like reference numerals designate the same elements in the several views, and in which.

Figure 1:
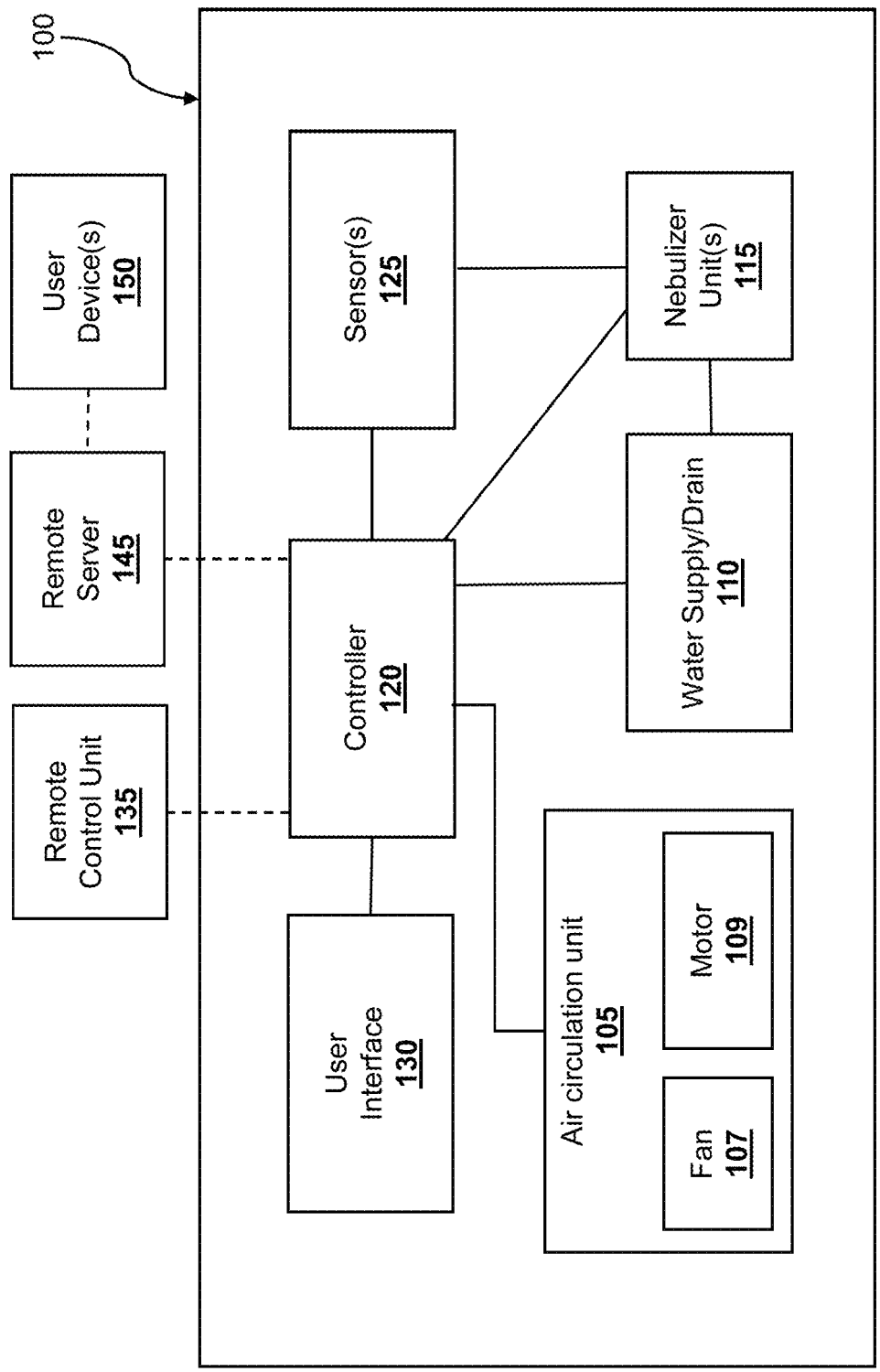
FIG. 1 is a block diagram illustrating a humidifying system, according to an exemplary embodiment.

The foregoing and other features of the present disclosure will become apparent from the following description and appended claims, taken in conjunction with the accompanying drawings. Understanding that these drawings depict only several embodiments in accordance with the disclosure and are therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

Referring generally to the figures, an improved humidifying system that provides enhanced failure detection and mitigation mechanisms is disclosed. Humidifying systems provide humidified air on demand. Humidifying systems may a variety of complex components with a closed device. These components may include nebulizer units that convert water to a mist to increase humidity of the air within a building space. Like many movable components, these nebulizer units may be vulnerable to failure. Traditionally, determining failure of such units has required visual inspection of the units during operation, which can be hazardous (to the individual inspecting the units as well as the components of the humidifier), onerous, inefficient, and unreliable. Disclosed herein is an improved system and method that provides for real-time, automated monitoring of the failure status of nebulizer units. In addition, various enhanced remediation measures are disclosed herein for mitigating the impact or consequences of nebulizer unit failure. The disclosure herein thus describes an improved humidifying system have a safer, more reliable, more efficient, and easier manner of detecting nebulizer unit failure and mitigating the effects of such failure.

Referring to FIG. 1, a schematic representation of a humidifying system 100 is shown, according to an exemplary embodiment. As shown, the humidifying system 100 includes an air circulation unit 105 for circulating ambient air through and out of the humidifying system 100 and a water supply component 110 for controlling water flow within the humidifying system 100. The water supply component 110 is in fluid communication with an air circulation unit 105 and one or more nebulizer units 115. The water supply component 110 is configured to provide water to the one or more nebulizer units 115 where the nebulizer units 115 intermix the water and air from the air circulation unit 105 to increase humidity within the circulated air. The water supply component 110 may include water pipes, valves (e.g., solenoid valves), and other components known to those of skill in the art to enable the controllable supply of water to the nebulizer units 115. The air circulation unit 105 may include a fan 107 for circulating air and a motor 109, which is configured to drive the fan 107. The water supply component 110 may also include drain components (including pipes, valves, etc.) that are configured to drain excess water from the nebulizer unit(s) 115.

Figure 2:
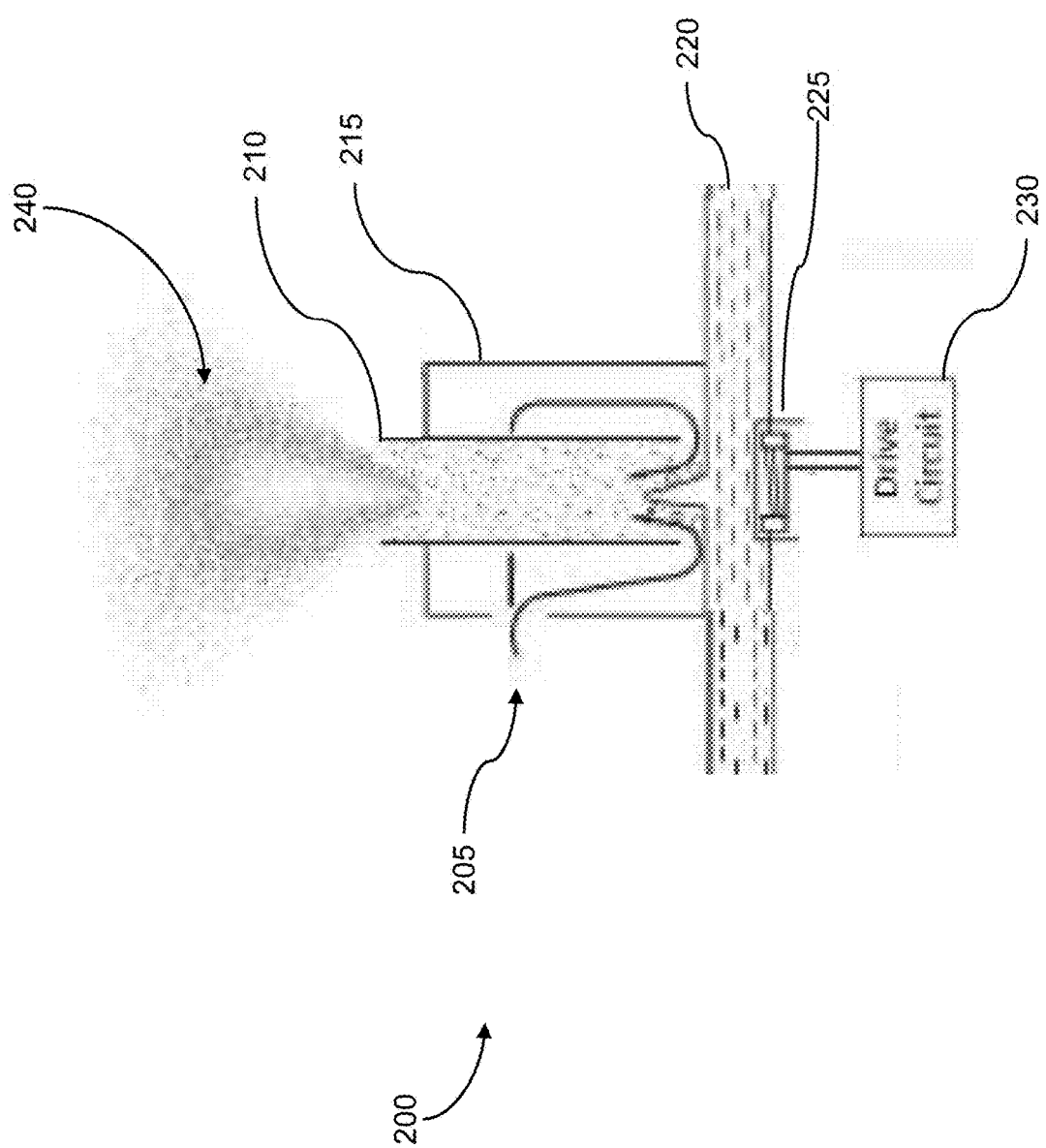
FIG. 2 is a schematic representation of a nebulizer unit of FIG. 1, according to an exemplary embodiment.

In an embodiment, the nebulizer unit(s) 115 may be an ultrasonic nebulizer unit having a piezoelectric transducer. FIG. 2 is a schematic representation of a nebulizer unit 200 (which may be used for the nebulizer unit(s) 115 of FIG. 1), according to an exemplary embodiment wherein the nebulizer unit 200 is an ultrasonic nebulizer unit. The nebulizer unit 200 includes a transducer 225 (e.g., a piezoelectric transducer) that is configured to controllably vibrate to agitate water within a water reservoir 220. The nebulizer unit 200 includes a drive circuit 230 that receives control signals from a controller (such as controller 120 from FIG. 1) to control the vibration and other operational characteristics of the transducer 225 as discussed elsewhere in the disclosure.

The water agitated by transducer 225 intermixes with air in an atomization chamber 215 forming a mist 240. The air is introduced to the nebulizer unit through an air inlet 205 of the atomization chamber 215 by an air circulation unit (such as air circulation unit 105 of FIG. 1). The movement of the air by the air circulation unit 105 forces the mist 240 out of a discharge tube 210 that is fluidly coupled to a space to be humidified.

The air circulation unit 105, water supply component 110, and nebulizer unit(s) 115 of FIG. 1 are operatively coupled to a controller 120, which may be configured to control operation of each of these units. In various embodiments, the controller 120 may include a non-transitory computer-readable medium, having computer-readable instructions stored thereon that, when executed by a processor or computing device, cause the processor or computing device to carry out operations called for by the instructions. In various embodiments, the controller 120 may include a thermostat, humidistat, or other such control devices. In yet other embodiments, the controller 120 may be configured as part of a data cloud configured to receive commands from a user control device and/or a remote computing device. The controller 120 may be configured to control operation and change operational states of the air circulation unit 105, water supply component 110, and nebulizer unit(s) 115 to controllably humidify air within a building space.

The controller 120 may be operably connected to one or more sensors 125, which may be configured to detect one or more characteristics associated with the nebulizer unit(s) 115. In one embodiment, the one or more sensors 125 include a current sensor configured to determine an amount of electrical current being drawn by a respective nebulizer unit 115, a voltage sensor configured to determine a voltage associated with the nebulizer unit 115, and/or a frequency sensor configured to determine a frequency parameter measurement associated with the nebulizer unit 115. In another embodiment, the one or more sensors 125 include an optical sensor configured to determine an amount (or other visual characteristic) of mist omitted from the nebulizer unit 115. The amount of mist may be a density of the mist, a height of the mist being discharged from the nebulizer unit 115, or any other optically visible characteristic of the discharged mist.

In a further embodiment, the one or more sensors 125 may include a vibration sensor configured to measure characteristics of the vibration of a respective nebulizer unit 115. For example, the vibration sensor may include a gyroscope that provides data regarding the vibration (e.g., magnitude of vibration, frequency of vibration, vibration patterns, etc.) or other information regarding movement of a nebulizer unit. In still another embodiment, the humidifying system 100 may include any combination of the foregoing sensors and any combination of such sensors may be configured to detect characteristics regarding a single nebulizer unit or multiple nebulizer units.

The controller 120 receives signals from the one or more sensors 125 conveying the various data being sensed, determined, measured, etc., from the nebulizer unit(s) 115. The controller 120 assesses this data to determine whether one or more of the nebulizer units 115 are about to enter or have entered a failure state. A failure state may be considered as a condition in which a nebulizer unit is no longer operating in a satisfactory manner. In response to a determination that a nebulizer unit is about to enter or has entered a failure state, the controller 120 may take one or more remediation actions. For example, the controller 120 may communicate an alert regarding the failure or impending failure of a particular nebulizer unit. In an embodiment, the controller 120 may cause the alert to be displayed via a user interface of the humidifying system 110 (e.g., a user interface of a particular humidifier unit). In other embodiments, the controller 120 may alternatively or additionally communicate the alert to a display of a remote control unit 135 (for example a building thermostat, humidistat or other control device) for presentation on the display of the remote control unit 135. Still further, the controller 120 may alternatively or additionally communicate the alert to a remote server 145 which may further communicate the alert for presentation on one or more networked devices (e.g., an app associated with the humidifier presented on a user device such as a smartphone).

In other embodiments, alternatively or in addition to generation of the alerts above, the controller 120 may modify the operation of one or more of the nebulizer units 115 in response to determining the present of a failure state or impending failure state for a particular nebulizer unit. For example, to enable finer, more precise control of humidity, the controller 120 may be configured to pulse the operation of the nebulizer units 115. Put another way, the controller 120 may turn the nebulizer units on and off for various periods of time to better control the humidification levels of an associated building space. As a humidity level within the associated building space approaches a desired humidity setpoint, pulsing is modulated such that the period of time for each pulse during which the nebulizer units 115 are turned off is increased. By increasing the off-time for each pulse as the humidity level approaches a setpoint, the humidifying system 100 can achieve finer, more precise control of the humidity level (e.g., minimize overshooting, etc.). However, upon determination that one or more nebulizer units 115 currently suffer or are about to suffer from degraded performance (including a failure state), the controller 120 may modify the pulse modulation to compensate for decreased humidification resulting from the degraded performance of one or more of the nebulizer units 115. For example, the normal time period during which the nebulizer units 115 would be turned off as the humidity level approaches the setpoint may be reduced to compensate for the degraded humidification performance. In this way, degradation of the overall humidification performance of the humidifying system 110 due to one or more failed nebulizer units may be mitigated or eliminated.

The controller 120 may also be operably connected to a user interface 130 (e.g., graphical user interface, one or more buttons, one or more dials, etc.), which may be configured to receive commands from a user related to operation of the humidifying system 100. In various embodiments, the controller 120 may be configured to receive one or more signals from the user interface 130. The controller 120 may be communicatively coupled to one or more remote controls 135 (e.g., thermostat, humidistat, portable user device, etc.) and/or one or more network coupled remote servers 145, which may be configured to send one or more signals to the controller 120.

Figure 3:
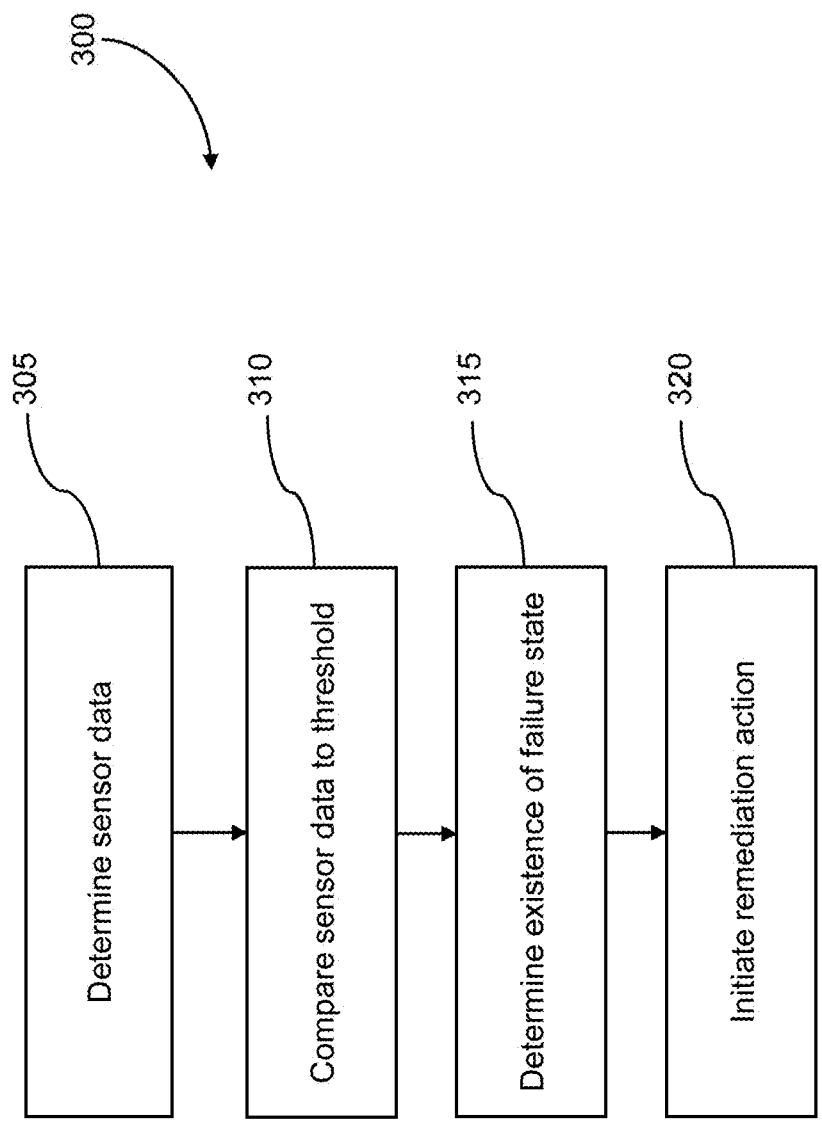
FIG. 3 is a flow diagram illustrating operations performed by a humidifying system, according to an exemplary embodiment.

FIG. 3 shows a flow diagram illustrating a method 300 of monitoring nebulizer unit operation performed by humidifying system 100, according to an exemplary embodiment. In an operation 305, a sensor of humidifying system 100 determines sensor data associated with operation of a nebulizer unit. The sensor may be any of the example sensors 125 discussed above. In determining the sensor data, the sensor may detect one or more characteristics associated with the nebulizer unit. In one embodiment, the sensor may be a current sensor in series with the nebulizer unit that determines an amount of electrical current being drawn by the nebulizer unit. In another embodiment, the sensor may be an optical sensor that detects an amount of mist omitted from the nebulizer unit. The amount of mist may be a density of the mist, a height of the mist being discharged from the nebulizer unit, or any other optically visible characteristic of the discharged mist. In a further embodiment, the sensor may be a vibration sensor (e.g., a gyroscope) that measures characteristics of the vibration (magnitude of vibration, frequency of vibration, vibration patterns, etc.) of a piezoelectric transducer of the nebulizer unit.

In an operation 310, a controller of the humidifying system 100 compares the sensor data associated with operation of the nebulizer unit to a threshold that is indicative of a failure state of the nebulizer unit. In an embodiment, the threshold may be predetermined based on testing or analysis of the humidifying system prior provision of the humidifying system for customer use. For example, testing of the system could indicate that a properly functioning nebulizing unit will have a current draw in a normal expected range. The threshold may be set as a certain amount of current or percentage of draw outside of that normal expected range. Alternatively, it could be determined that upon failure of the nebulizer unit, the current draw changes to a new range outside of the normal expected range and the threshold is set to an amount indicative of this new range.

In an alternative embodiment, the threshold may be dynamically determined during operation of the humidifying system. For example, the controller would monitor the sensor data for the nebulizer unit over an initial period of time (e.g., an initialization period) to establish a baseline for the sensor data. After establishment of the baseline, the sensor data would be compared to the baseline. The threshold would be determined as a certain difference (e.g., a set percentage difference) from the baseline. In an embodiment, the baseline may be determined for a specific system empirically and hard-coded so that if a nebulizer met or exceed a statistically relevant number the humidifier an alert would be generated. In another embodiment, the humidifying system may have an initialization period that runs after maintenance or startup where the new baseline is determined for each specific nebulizer having had service performed or not having a prior baseline established. The baseline for each nebulizer would be saved in the memory and, in some cases, only reset when changed in service.

In some embodiments, a machine learning algorithm may be used to determine the baseline for the sensor data. The machine learning algorithm may be trained on similar systems or encoded based on similar, ideal system performance. As the humidifying system is run, the machine learning algorithm would identify changes in operation of the humidifying system and/or nebulizers including changes in baseline characteristics.

Figure 4:
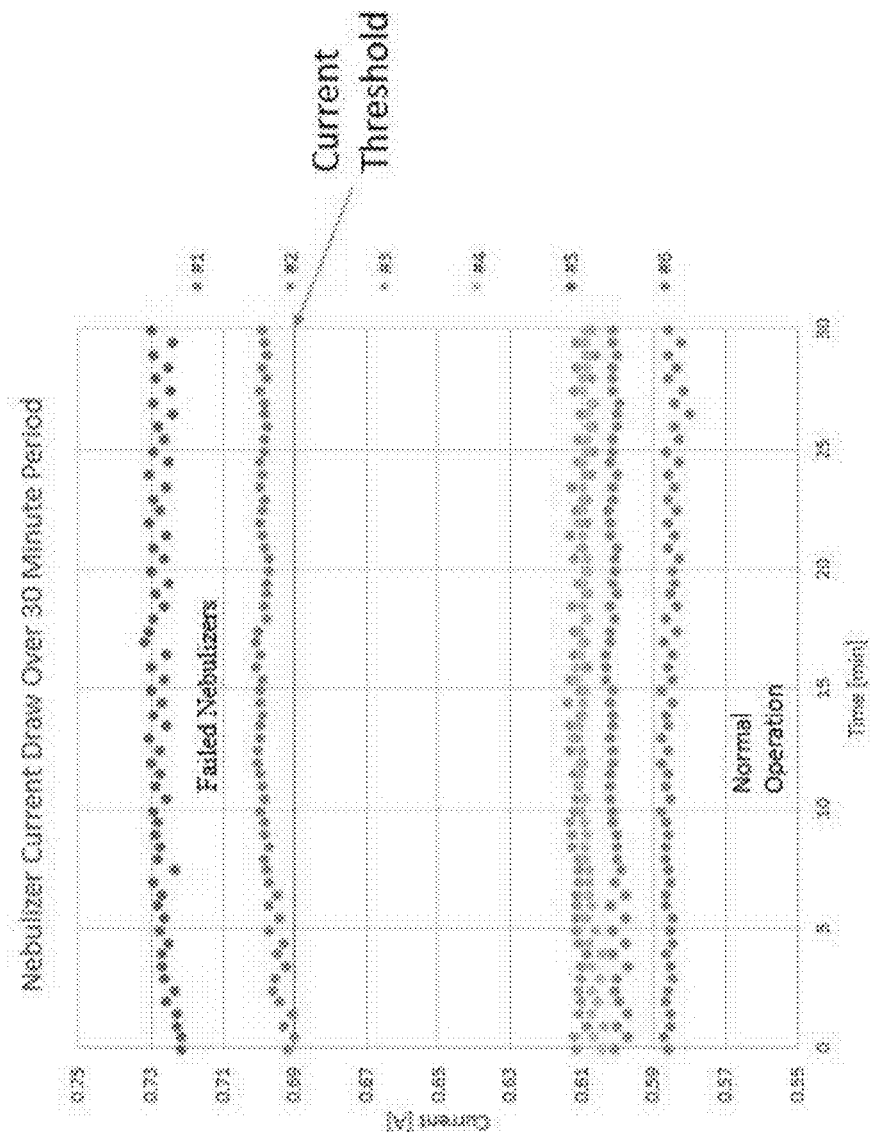
FIG. 4 depicts a chart showing the current draw over time of six distinct nebulizer units in accordance with an illustrative embodiment.

FIG. 4 depicts a chart showing the current draw over time of six distinct nebulizer units in accordance with an illustrative embodiment. The first four nebulizer units each have a current draw in the range of 0.58-0.62 Amps, which was determined to be associated with normal operation of these particular nebulizer units. The fifth and sixth nebulizer units each have a current draw in the range of 0.69-0.73 Amps, which was determined to be associated with a failed state for these particular nebulizer units. Accordingly, an example current threshold of 0.69 Amps is shown in FIG. 4, wherein a current measurement exceeding this threshold would indicate a failure state of an associated nebulizer unit. In other embodiments, different current draw ranges may exist.

Where it is desired to identify an impending failure state for a nebulizer unit, the threshold may be based on a rate of change of the sensor data. For example, as shown in FIG. 4, a generally consistent current draw may be expected for a normally operating nebulizer unit. Accordingly, an increase in current draw, particularly one that extends of a period of time, is also indicative of an impending (and possibly a current) failure state. Thus, the threshold could be set as a specific rate of change of the sensor data that is determined to be outside of that expected for normal operation.

In other embodiments, the threshold may be set as a certain density of mist or height of the mist jet above the nebulizer unit that is indicative of the failure state, which may be predetermined or dynamically determined in a similar manner as the current draw discussed above. Still further, the threshold may be set as a certain magnitude, frequency, or pattern of vibration of a piezoelectric transducer that is indicative of the failure state, which again may be predetermined or dynamically determined in a similar manner as the current draw discussed above In an operation 315, in response to the data associated with the operation of the nebulizer unit satisfying the threshold, the controller determines the existence of a failure state for the nebulizer unit. As used herein, the term "satisfy" refers to a scenario in which a measured or sensed value (e.g., current draw, voltage peak, electrical signal frequency, mist density, mist height, vibration magnitude, vibration frequency, etc.) exceeds a set point value or is substantially equal to the set point value. Thus, in accordance with the various example embodiments discussed above, in response to any of the sensed current draw, sensed mist density, sensed mist height, sensed vibration magnitude, sensed vibration frequency, etc., satisfying an associated threshold, the controller determines that the nebulizer unit associated with the corresponding sensed data has failed.

In an operation 320, in response to determination of the existence of the failure state for the nebulizer unit, the controller initiates a remediation action with respect to the failed nebulizer unit. The remediation may include generating an alert indicating the failure or impending failure of the failed nebulizer unit and/or modifying operation of one or more of the nebulizer units (including or not the failed nebulizer unit). For example, the controller may cause an alert to be displayed via a user interface of the humidifying system (e.g., a user interface of a particular humidifier unit), communicate an alert to a remote control unit (for example a building thermostat, humidistat or other control device) for presentation on the display (visibly or audibly) of the remote control unit, and/or communicate an alert to a remote server which may further communicate the alert for presentation via one or more networked devices (e.g., an app associated with the humidifier presented on a user device such as a smartphone).

In addition, the controller may modify the operation of one or more nebulizer units in response to determining the existence of a failure state or impending failure state for a particular nebulizer unit. For example, the controller may modify the normal pulse modulation for the nebulizer units to compensate for the worsening performance of the failed nebulizer unit. In an embodiment, the amount of time that the nebulizer units are normally pulsed off may be decreased to compensate for the degraded humidification performance of the failed nebulizer unit. In this way, degradation of the overall humidification performance of the humidifying system due to one or more failed nebulizer units may be mitigated or eliminated.)

Figure 5:
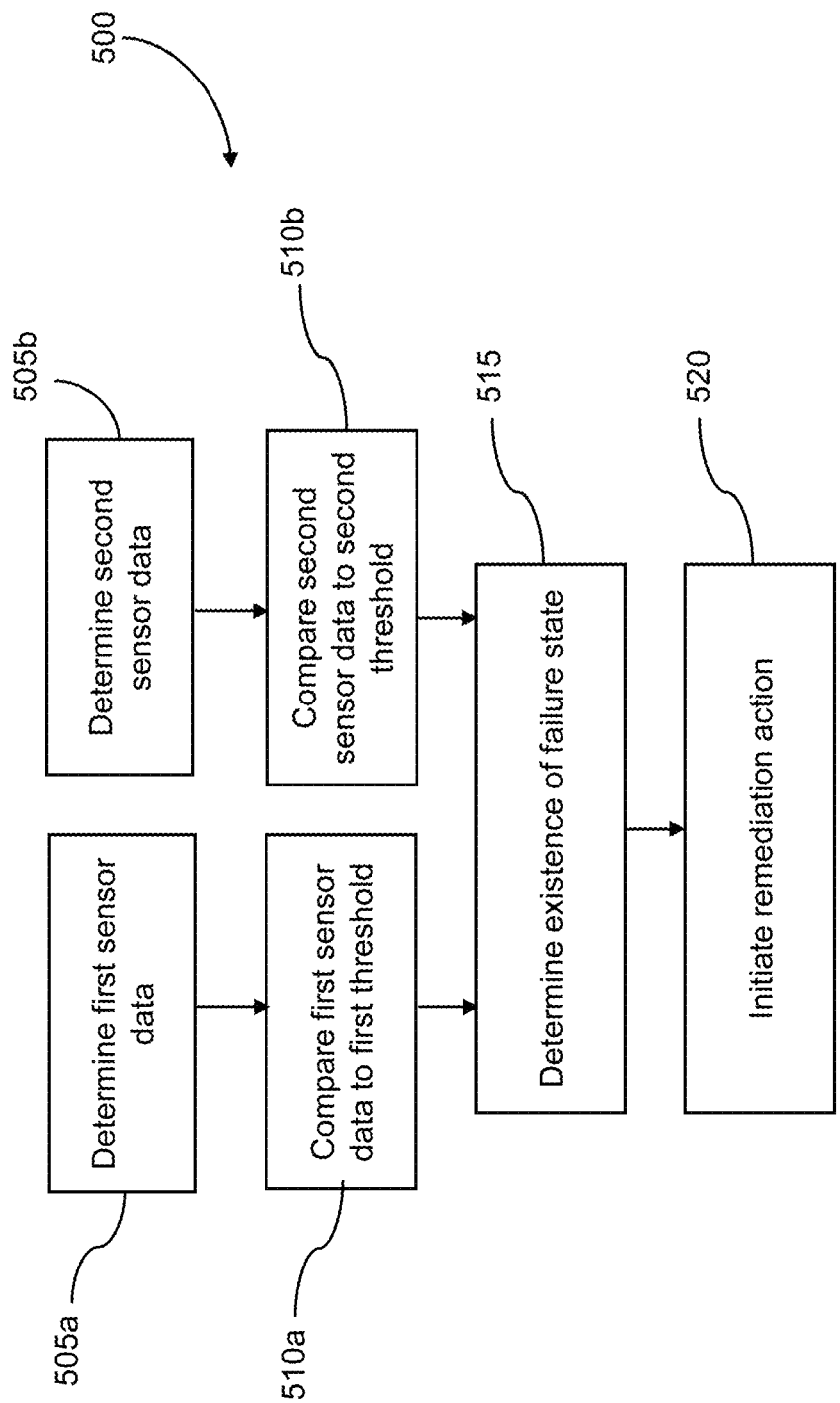
FIG. 5 is a flow diagram illustrating operations performed by a humidifying system, according to another exemplary embodiment.

FIG. 5 shows a flow diagram illustrating a method 500 of monitoring nebulizer unit operation performed by humidifying system 100, according to another exemplary embodiment. In an operation 505*a*, a first sensor of humidifying system 100 determines first sensor data associated with operation of a nebulizer unit. The first sensor may be any of the example sensors 125 discussed above. In determining the first sensor data, the first sensor may detect one or more characteristics associated with the nebulizer unit. Operation 505*a* may be performed in a similar manner as operation 305 from FIG. 3 as discussed previously.

In an operation 505*b*, a second sensor (which is different from the first sensor) of humidifying system 100 determines second sensor data associated with operation of the nebulizer unit. Like the first sensor above, the second sensor may also be any of the example sensors 125 discussed above except that it will be of a different sensor type and thus used for sensing a different type of data than that of the first sensor in operation 505*a*. For example, the first sensor may be a current sensor that determines an amount of electrical current being drawn by the nebulizer unit while the second sensor may be an optical sensor that detects an amount of mist omitted from the same nebulizer unit. In determining the second sensor data, the second sensor may detect one or more characteristics associated with the same nebulizer unit as referred to operation 505*a*. Like, operation 505*a*, operation 505*b* may be performed in a similar manner as operation 305 from FIG. 3 as discussed previously.

In still further embodiments, additional operations may be performed in which still further sensors (third, fourth, etc.) are used to determine additional data regarding the nebulizer unit. For example, a third sensor such as a vibration sensor may measure characteristics of the vibration (magnitude of vibration, frequency of vibration, vibration patterns, etc.) of a piezoelectric transducer of the nebulizer unit.

In an operation 510*a*, a controller of the humidifying system 100 compares the first sensor data associated with operation of the nebulizer unit to a first threshold that is indicative of a failure state of the nebulizer unit. Operation 510*a* may be performed in a similar manner as operation 310 from FIG. 3 as discussed previously. In an operation 510*b*, the controller of the humidifying system 100 compares the second sensor data associated with operation of the nebulizer unit to a second threshold that is indicative of a failure state of the nebulizer unit. Like operation 510*a*, operation 510*b* may also be performed in a similar manner as operation 310 from FIG. 3 as discussed previously except that the second sensor data is compared to a second threshold that is distinct from the first threshold and indeed directed to the specific type of data of the second sensor data. For example, in one embodiment, first sensor data such as an amount of current draw is compared in operation 510*a* to a current amount threshold, while second sensor data such as an amount of mist is compared in operation 510*b* to a mist amount threshold. In still further embodiments where additional sensors/sensor data is obtained for the nebulizer unit, additional operations may be performed in which still such data is compared to additional thresholds. For example, third sensor data such as a vibration magnitude may be compared to a vibration magnitude threshold.

In an operation 515, in response to both the first sensor data satisfying the first threshold and the second sensor data satisfying the second sensor data, the controller determines the existence of a failure state for the nebulizer unit. By requiring that both the first and second thresholds be satisfied by the first and second sensor data, respectively, the accuracy of the failure determination is increased and thus greater assurance provided with respect to a failure notification. In further embodiments where additional sensors/sensor data is obtained for the nebulizer unit and depending on the risk tolerance, desired accuracy, and other design objectives, a determination of the existence of the failure state can be based on a majority of the sensor data satisfying corresponding thresholds or in response to all of the sensor data satisfying corresponding thresholds.

In an operation 520, in response to determination of the existence of the failure state for the nebulizer unit, the controller initiates a remediation action with respect to the failed nebulizer unit. Operation 520 may be performed in a similar manner as operation 320 from FIG. 3 as discussed previously. In addition, an alert associated with the remediation action may further include an indication of what type of sensor data and the specific magnitude, value, etc., associated with the sensor data triggered the alert so that a user can more easily discern between potential failure types (particularly where multiple sensor types are being utilized but failure of all sensor types is not required to trigger a failure notification).

Figure 6:
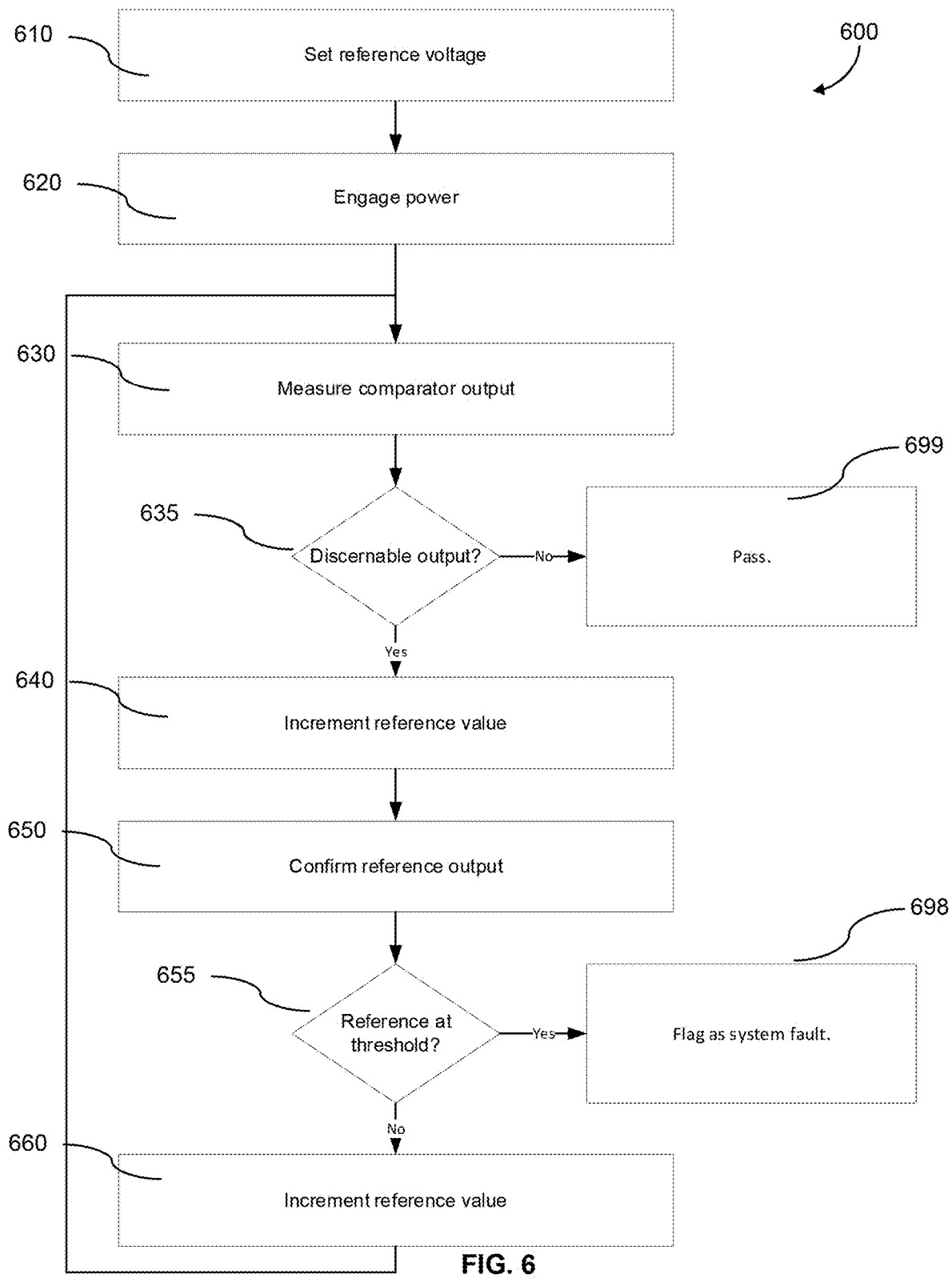
FIG. 6 is also a flow diagram, illustrating a method of monitoring nebulizer unit operation performed by a humidifying system, according to an exemplary embodiment.

FIG. 6 shows a flow diagram illustrating a method 600 of monitoring nebulizer unit operation performed by humidifying system 100, according to yet another exemplary embodiment. Like other combinatorial embodiments of the present disclosure, the method 600 may be performed in combination with additional methods disclosed herein. For example, the method 600 may be performed in combination with the method 300 of FIG. 3, wherein remediation action is taken in the event of any failed transducers (e.g., piezoelectric transducers). Alternatively, or in addition, the method 600 depicted by FIG. 6 may be performed in combination with additional methods, such as the methods described, infra, by FIGS. 7 and 8. Further, the method 600 may be performed for multiple iterations. For example, the method may be performed to determine a peak positive voltage, and to establish a peak negative voltage (e.g., sequentially, simultaneously, etc.).

At operation 610, a reference voltage value is set. The reference voltage may be selected according to a minimum or maximum value (i.e., may be associated with a threshold). Some references may be compared to a maximum and minimum thresholds (i.e., may be associated with a band pass threshold). Some voltage references may be stepped from a threshold value (e.g., if a maximum threshold of 12V is set, an initial voltage of 10.5 may be set, so that it is five 0.3 volt steps from the threshold). The voltage may be a DC, sinusoidal, or another periodic signal, and may contain independent positive and negative voltages. At operation 620, the transducer is energized (e.g., by closing an external mechanical or solid state switch, selecting an output of a test apparatus, etc.). At operation 630, a comparator output is sampled, which may determine whether the transducer signal exceeds the reference voltage. At operation 625, the value of the comparator output is discerned. For example, value of the comparator output may be determined with respect to a ground plane, or may be resolved to a digital value (e.g., a value indicating whether the comparator voltage exceeds a limit). For example, a signal may be passed to an operational amplifier configured to saturate in a first direction in the presence of a signal exceeding the reference voltage, and output a different fixed voltage in the event the input signal does not exceed a reference voltage. If no output is discerned at operation 635 (e.g., because the voltage does not exceed the threshold), the peak voltage may be recorded (e.g., by further measurement, or by linear interpolation of various threshold iterative reference voltage values), and the unit may be designated as passed at operation 699. One skilled in the art will understand that a non-output from the comparator output is not intended to be limiting, and is merely an illustrative example. In some embodiment, the presence of an output, an output exceeding a voltage threshold or another signal may be indicative of a passed unit. Indeed, in some embodiments, it may be possible to invert or alter such a signal merely by inverting various circuit signals, such as inputs to the comparator.

At operation 640, if a discernible output is present, the reference value may be lowered (e.g., by a dynamically scaled or pre-defined percent, step, etc.). For example, if the reference voltage of operation 610 was −3.3 v, a value of −3.5 volts may be set. The reference value may be confirmed at operation 650. For example, the reference value could be compared to an allowable range (e.g., a reference value of −3.5 v may be verified against a range of −3.45 to −3.55 volts). In some embodiments, the reference voltage may be implicitly confirmed (e.g., be presumed to be as set). At operation 655, the adjusted reference voltage is compared to a threshold (e.g., if −3.5 v would indicate a failed transducer), the transducer is flagged as a failed unit, at operation 698, which may also comprise recording various diagnostic indications of the voltage as well as any current or frequency measurements. At operation 660, optionally, if the adjusted reference voltage has not reached a threshold (e.g., if the threshold is −4 volts), the reference voltage may be further adjusted (e.g., from −3.5 to −3.7 v), and method 600 may proceed to operation 630, continuing to adjust the reference voltage until a signal is not discernible from the comparator, indicating a passed transducer (i.e., operation 699), or a threshold is reached indicating a failed transducer (i.e., operation 698).

Figure 7:
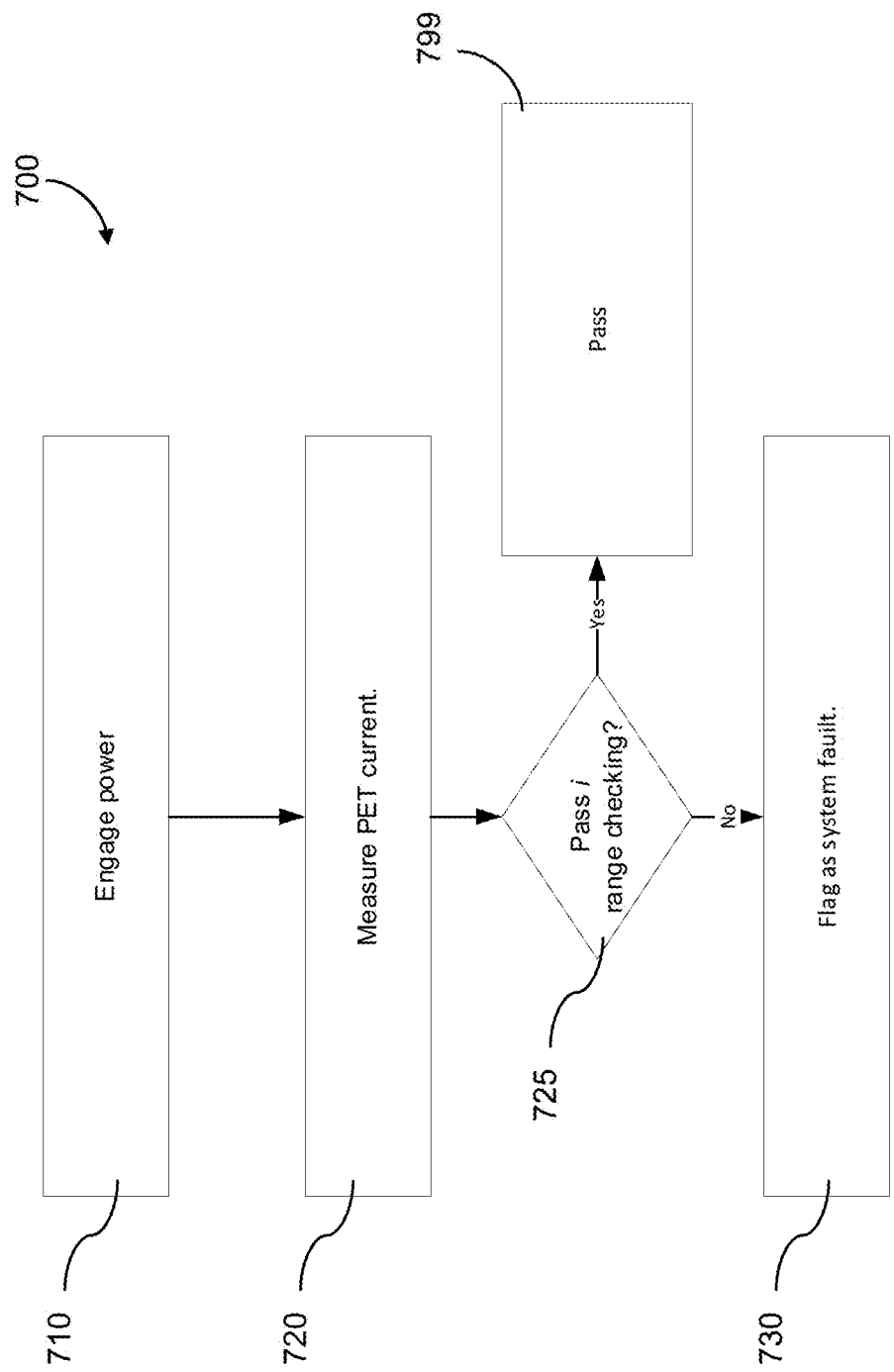
FIG. 7 is another flow diagram, illustrating a method of monitoring nebulizer unit operation performed by a humidifying system, according to another exemplary embodiment.

FIG. 7 shows another flow diagram illustrating a method 700 of monitoring nebulizer unit operation performed by humidifying system 100, according to another exemplary embodiment. At operation 710, the transducer current is measured. At operation 725, the measured value is range checked against a normal operating value. Range checking may comprise an instantaneous or time averaged maximum, minimum, or band having a maximum and a minimum. If the measured transducer current is determined to be within a normal range, the current measurements may be stored at operation 799 (which may include associating the results to a particular transducer), and the transducer under test may be passed. If the measured transducer current is determined to be outside of a normal range, the method may flag the transducer as a failed component.

Figure 8:
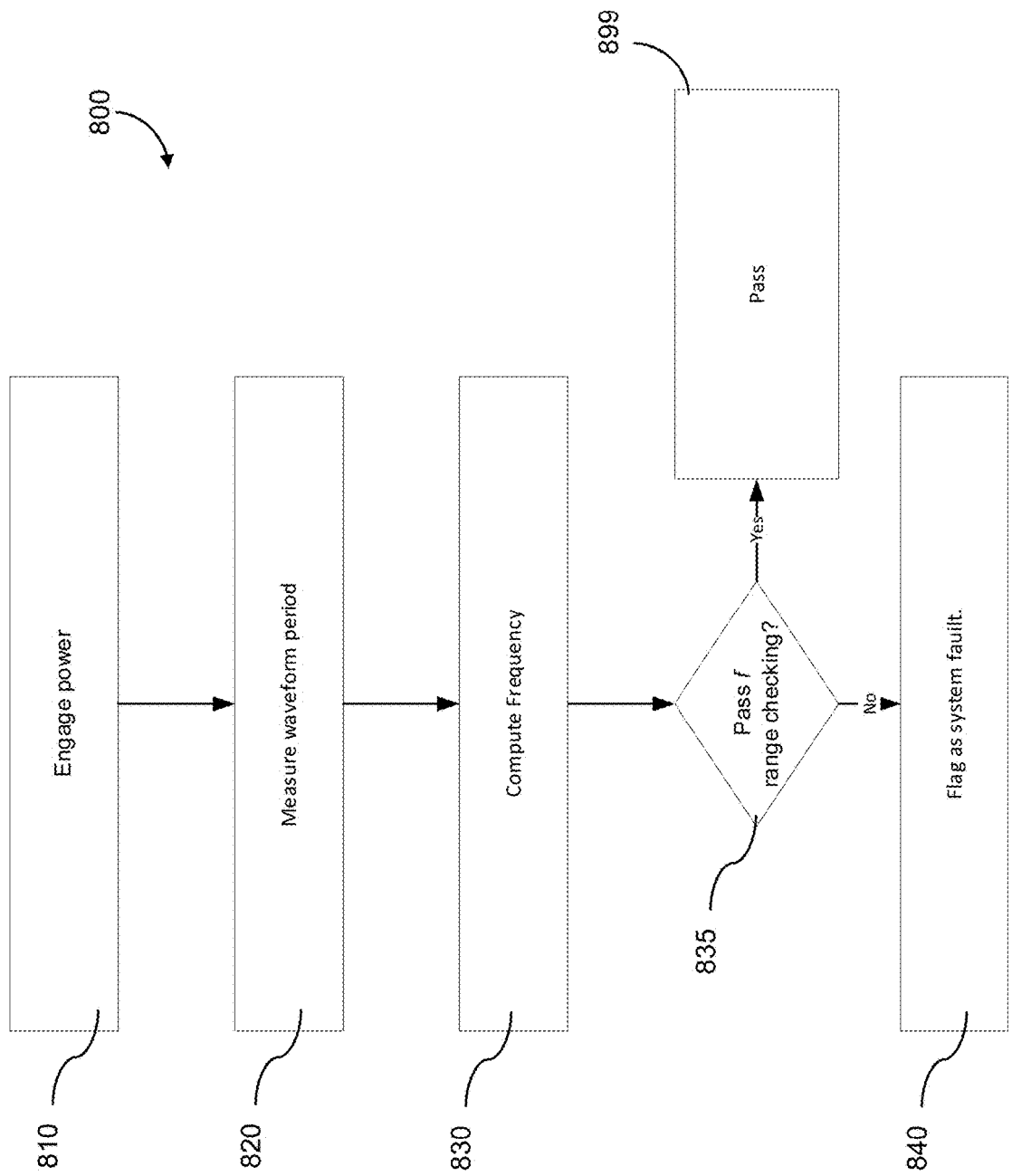
FIG. 8 is yet another flow diagram, illustrating a method of monitoring nebulizer unit operation performed by a humidifying system, according to yet another exemplary embodiment.

FIG. 8 shows another flow diagram illustrating a method 800 of monitoring nebulizer unit operation performed by humidifying system 100, according to yet another exemplary embodiment. At operation 810, power is engaged, which may be by a switch closing (e.g., a mechanical relay, solid state switch, etc.). At operation 820, a waveform period is measured. For example, period between zero crossings, or peak measurements may be calculated. At operation 830, a frequency associated with the period of operation 830 is calculated. At operation 835, the calculated frequency is checked against a range. The range may comprise an upper and/or lower bound. If the transducer is determined to be within the range, the transducer may be determined to pass at operation 899, which may include recording data associated with the transducer, such as the frequency and/or any data associated with other tests (e.g., various voltage and current measurements). If the transducer is determined to be out of range, the transducer may be flagged as a failed unit at operation 840. Such flagging may be a mere indication of failure, or may comprise cataloging additional date, such as the measured frequency, which may be further processed to determine false failures, failure modes, etc. As one skilled in the art will understand, various transducers may have various associated frequencies (and voltages, currents, etc.), which may alter over time, temperature, use case, etc. In some embodiments various thresholds, references, etc. may be normalized to relevant parameters.

Figure 9:
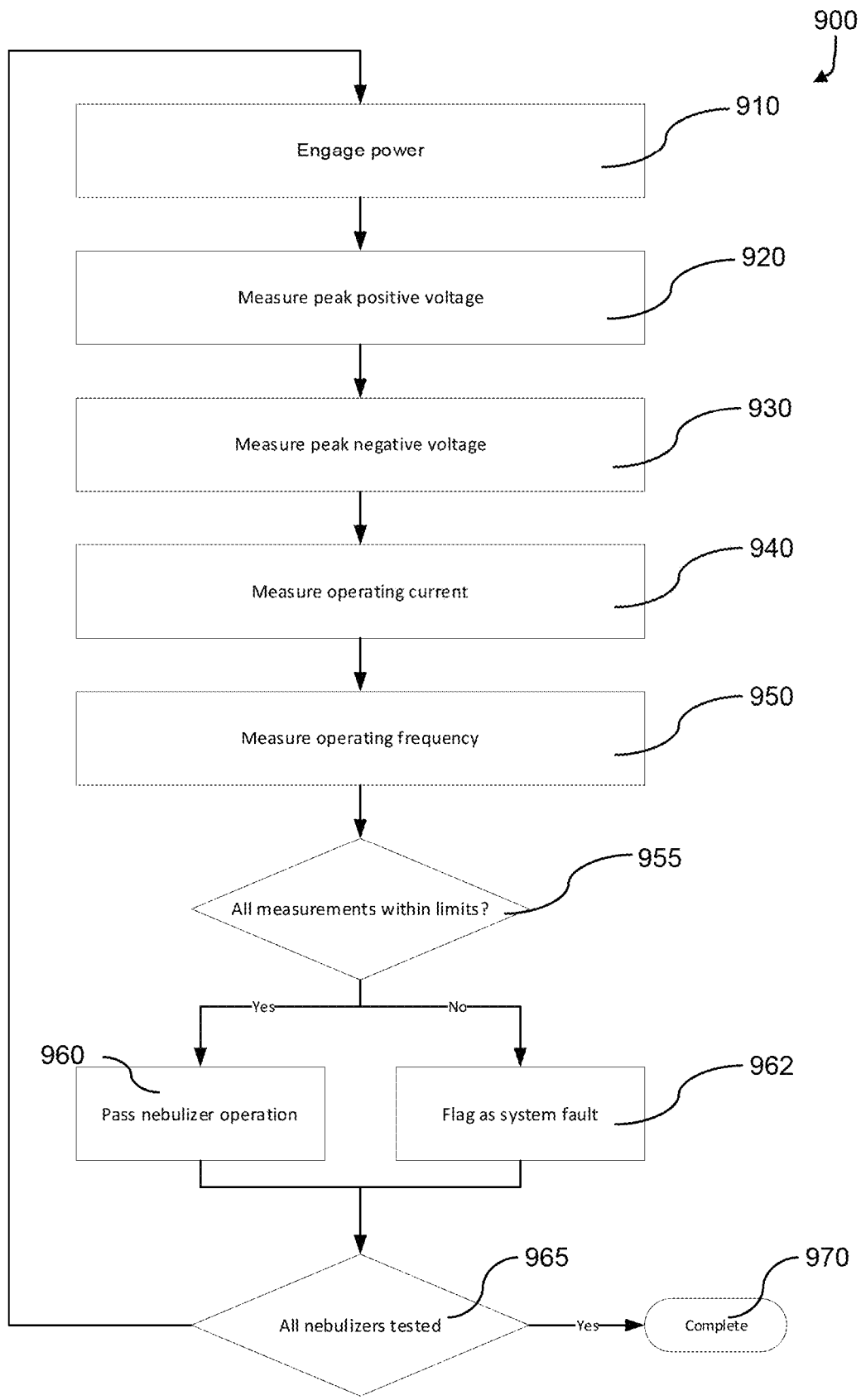
FIG. 9 is a further another flow diagram, illustrating a method of monitoring nebulizer unit operation performed by a humidifying system, according to another exemplary embodiment.

FIG. 9 shows another flow diagram illustrating a method 900 of monitoring nebulizer unit operation performed by the humidifying system 100, according to yet another exemplary embodiment. For example, the method 900 may be used to test the operation of a plurality of piezoelectric transducers of the humidifying system 100. At operation 910, power is engaged to at least one nebulizer. At operation 920, a positive peak voltage of or associated with one or more nebulizers is measured. The measurement of the positive peak voltage may be performed by the method 600 disclosed by FIG. 6, a variant thereof, or otherwise. For example, various fault flags and/or determinations may be deferred to a later operation. In some embodiments, if a determination is based on an average value of multiple measurements, those sub-operations may be deferred to after a plurality of data have been collected. Alternatively or in addition, operation 920 may comprise a plurality of cycles (e.g., 3, 5, 10, or 25 cycles), and the operation 920 may comprise determining an average (from which failure may or may not be determined). At operation 930, a negative peak voltage of or associated with one or more of the nebulizers evaluated in operation 920 is measured. The negative peak voltage may be measured similarly to the positive peak voltage. Advantageously, such a method 900 may simplify some embodiments, and enable parallel operations. In some embodiments, the negative peak voltage may be measured differently than the positive peak voltage. Advantageously such embodiments may allow for further method optimization (e.g., if nebulizers having a positive peak voltage within range rarely have a negative peak voltage in range, then a number of cycles of the negative peak voltage may be less than the number of cycles of the positive peak voltage, or vice versa). Some embodiments may only measure one peak voltage, which may be either a positive or negative voltage. The negative peak voltage may be negative with respect to one or more reference grounds, to the positive peak voltage, etc.

At operation 940, an operating current of or associated with the at least one nebulizer is measured. For example, the operating current may be measured according to the operation 700 depicted in FIG. 7, a variant thereof, or otherwise. Multiple iterations of the method 700 depicted in FIG. 7 may be conducted, and a determination of normal operation may be dependent on one and/or more averages or measurements (e.g., a first threshold may be applied to an average, and a second threshold may be applied to one or more individual measurements). At operation 950, a frequency of or associated with the at least one nebulizer is measured. As for operations, 920, 930, and 940, the operating current may be measured according to other disclosures contained within (e.g., the operation 800 depicted in FIG. 8), a variant thereof, or otherwise.

At operation 955, a determinations of whether all measurements are within limits is made. The determination may logically combine the determinations at each operation (e.g., logically ORing failure flags), or may depend upon multiple operations (e.g., averages, deviations between operations wherein one marginal result may be acceptable, but combined with additional marginal results may indicate a failure, etc.). In some embodiments, various data may be provided to an analytics module which may process the data, and return a condensed result, and the failure may be determined based on the condensed result. Advantageously, such a system may enable the adjustment of various thresholds, numbers of averages, etc., in order to reduce test time, decrease false negative and/or positive results, aggregate a larger data set, etc.

At operation 960, the nebulizer is determined to be operating acceptably, based on the determination that all measurements are within desired limits. The operation may include recording unit operation parameters (voltage, frequency, current, temperature, etc.) which may be used to track unit health, predict failures, improve prognostics capability, determine nebulizer operating life in various applications/environments, etc. Alternatively, at operation 962, if one or more measurements are not determined to be within desired limits, the unit may be flagged as a failed unit. A failed unit may be repaired, replaced, or removed from a system (e.g., logically, electrically, mechanically, etc.) and/or adjustments may be made to remaining reserve or operational nebulizers to maintain system performance. For example, an indication of failure may be generated, and transmitted to a user to take remedial action, or the humidifying system 100 may automatically take remedial action and/or indicate an operational status comprising the failed units. An indication may be presented to a user through a graphical user interface wherein the graphical user interface depends on the individual identity of the failed units, the failure modes, the number of failed units, etc.

At operation 965, a determination of whether all nebulizers have been tested is conducted, for example, nebulizers may be sequenced according to a location or a unique identifier, which may in incremented at operation 965 or another step. If all nebulizers have not been tested, the unit may return to operation 910. "All nebulizers" may refer to every nebulizer of a system, a subset required to be tested (e.g., according to prognostic data), a number sufficient to determine an test outcome, etc. At operation 970, the test is determined to be complete. At operation 970, various system level results and/or reporting may be conducted. For example, a unit health may be determined according to the status of the various nebulizers. For example, a unit health may be displayed with varied prominence on a graphical user interface (e.g., a first threshold may determine a good unit, which may be indicated in green; a second threshold may indicate a marginal unit which may be indicated in yellow, and a third threshold may indicate a failed unit, which may be indicated in red). In addition or alternatively, the humidifying system 100 may generate notifications in response to the various statuses. For example, the statuses may indicate the nebulizers in need of repair, the system status (e.g., 100% capacity, 90% capacity, "good," "failed," etc.).

One skilled in the art will understand that the method 900 may be completed with various additional, fewer, or altered steps. For example, although the method 900 described herein discloses repeated engagements of power, the method 900 may also comprise various disengagements of power which are not explicitly recited, or may maintain power throughout the operation, obviating the need to repeatedly engage power, as recited by operation 910. Likewise, various operations may be added, for example, the unit may check for failure throughout the method 900 rather than solely at operation 962. Further, the data recorded at operation 960 may be recorded at 962 (in addition, instead of, etc.) which may aid in characterizing various failures.

Notwithstanding the embodiments described above in FIGS. 1-9, various modifications and inclusions to those embodiments are contemplated and considered within the scope of the present disclosure.

It is also to be understood that the construction and arrangement of the elements of the systems and methods as shown in the representative embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed.

Accordingly, all such modifications are intended to be included within the scope of the present disclosure. Any means-plus-function clause is intended to cover the structures described herein as performing the recited function and not only structural equivalents but also equivalent structures. Other substitutions, modifications, changes, and omissions may be made in the design, operating conditions, and arrangement of the preferred and other illustrative embodiments without departing from scope of the present disclosure or from the scope of the appended claims.

Furthermore, functions and procedures described above may be performed by specialized equipment designed to perform the particular functions and procedures. The functions may also be performed by general-use equipment that executes commands related to the functions and procedures, or each function and procedure may be performed by a different piece of equipment with one piece of equipment serving as control or with a separate control device.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Similarly, unless otherwise specified, the phrase "based on" should not be construed in a limiting manner and thus should be understood as "based at least in part on." Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances, where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent Moreover, although the figures show a specific order of method operations, the order of the operations may differ from what is depicted. Also, two or more operations may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection operations, processing operations, comparison operations, and decision operations.

The operations described in this specification can be implemented as operations performed by a data processing apparatus on data stored on one or more computer-readable storage devices or received from other sources. The term "data processing apparatus" or "computing device" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and an I/O device, e.g., a mouse or a touch sensitive screen, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTJVIL page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. In some cases, the actions recited herein can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system for humidifying an indoor space, the system comprising:
    a nebulizer unit configured to create a mist for humidifying the indoor space;
    an air circulation unit configured to provide air to the nebulizer unit;
    a water supply component configured to control water flow from a water source to the nebulizer unit;
    a first sensor configured to determine data regarding a characteristic of the nebulizer unit; and
    a controller operably coupled to the nebulizer unit and the first sensor, wherein the controller is configured to:
        receive first data associated with operation of the nebulizer unit from the first sensor, the first data comprising a plurality of measurements;
        dynamically determine a threshold indicative of a failure state of the nebulizer unit by, at least in part:
            determining an expected baseline for the first data during operation of the system; and
            setting the threshold based on the expected baseline for the first data;
        compare each of the plurality of measurements of the first data associated with operation of the nebulizer unit to the threshold;
        in response to a determination that a predetermined number of the plurality of measurements of the first data associated with the operation of the nebulizer unit satisfy the threshold, determine existence of the failure state for the nebulizer unit; and
  - in response to determination of the existence of the failure state, initiate a remediation action with respect to the nebulizer unit,
- wherein the remediation action comprises modifying pulse modulation of a plurality of nebulizers other than the nebulizer for which the failure state has been determined.

2. The system of claim 1, wherein the remediation action further comprises generation of a nebulizer failure notification and provision of the nebulizer failure notification to a remote, networked device.

3. The system of claim 1, wherein the first sensor comprises at least one of a current sensor, a peak voltage sensor, or a frequency sensor, and wherein the threshold comprises at least one of a maximum voltage, a maximum current, and a frequency band.

4. The system of claim 3, wherein:
- the first sensor comprises the current sensor, the peak voltage sensor, and the frequency sensor;
- the threshold comprises at the maximum voltage, the maximum current, and the frequency band; and
- the maximum voltage comprises a maximum amplitude of a positive peak voltage, and a maximum amplitude of a negative peak voltage.

5. The system of claim 1, wherein the nebulizer unit comprises an ultrasonic nebulizer unit including a piezoelectric transducer, wherein the first sensor comprises a vibration sensor, wherein the first data associated with the operation of the nebulizer unit comprises a magnitude of vibration of the piezoelectric transducer, and wherein the threshold is indicative of an amount of vibration of the piezoelectric transducer associated with the failure state of the nebulizer unit.

6. The system of claim 1, further comprising a second sensor configured to sense second data associated with operation of the nebulizer unit, wherein the controller is further configured to:
- receive the second data from the second sensor; and
- determine existence of the failure state for the nebulizer unit in response to both the first data associated with the operation of the nebulizer unit satisfying the threshold and the second data associated with the operation of the nebulizer unit satisfying a second threshold indicative of the existence of the failure state for the nebulizer unit.

7. The system of claim 6, wherein:
- each of the first sensor and the second sensor comprises at least one of a current sensor, a peak voltage sensor, or a frequency sensor; and
- the threshold comprises at least one of a maximum voltage, a maximum current, and a frequency band.

8. The system of claim 1, wherein the nebulizer unit comprises a piezoelectric transducer, the air circulation unit comprises a fan and a motor, and the water supply component comprises a water pipe and a water valve.

9. The system of claim 1, wherein the controller is configured to determine the expected baseline by, at least in part, monitoring the first data over a period of time during which the system is operating, and determining the expected baseline based on the first data monitored over the period of time.

10. The system of claim 1, wherein the first data satisfies the threshold when the first data is greater than or equal to the threshold.

11. A method for detecting failure of components of a humidifying system, the method comprising:
- receiving, by a first sensor, first data associated with operation of a nebulizer;

dynamically determining, by a controller, at least one threshold indicative of a failure state of the nebulizer, wherein dynamically determining the at least one threshold comprises:
  determining an expected baseline for a type of data associated with the first data during operation of the humidifying system; and
  setting a first threshold based on the expected baseline for the first data, the at least one threshold comprising the first threshold;
comparing, by the controller, the first data associated with operation of the nebulizer to the first threshold;
determining, by the controller, the existence of the failure state for the nebulizer;
wherein determining the existence of the failure state for the nebulizer comprises determining the first data associated with the operation of the nebulizer satisfies the first threshold; and
in response to determination of the existence of the failure state, initiating, by the controller, a remediation action with respect to the nebulizer;
wherein the first sensor comprises a vibration sensor, wherein the first data associated with the operation of the nebulizer comprises a vibration magnitude and a vibration frequency of a transducer of the nebulizer, and wherein the first threshold is indicative of a pattern of vibration associated with the failure state of the nebulizer,
wherein the remediation action comprises modifying pulse modulation of a plurality of nebulizers other than the nebulizer for which the failure state has been determined.

12. The method of claim 11, wherein initiating the remediation action further comprises generating a nebulizer failure notification and providing the nebulizer failure notification to a remote device.

13. The method of claim 11, further comprising:
receiving, by a second sensor, second data associated with operation of the nebulizer;
dynamically determining, by the controller, a second threshold indicative of the failure state of the nebulizer, the at least one threshold comprising the second threshold;
comparing, by the controller, the second data associated with operation of the nebulizer to the second threshold;
wherein the second sensor comprises a current sensor, wherein the second data associated with operation of the nebulizer comprises a current draw by the nebulizer, and wherein the second threshold is indicative of a minimum current draw associated with the failure state of the nebulizer; and
wherein determining the existence of the failure state for the nebulizer further comprises determining the second data satisfies the second threshold.

14. The method of claim 13, wherein the second threshold comprises at least one of a maximum voltage, a maximum current, and a frequency band.

15. The method of claim 11, further comprising:
receiving, by a third sensor, third data associated with operation of the nebulizer;
dynamically determining, by the controller, a third threshold indicative of the failure state of the nebulizer, the at least one threshold comprising the third threshold;
comparing, by the controller, the third data associated with operation of the nebulizer to the third threshold;
wherein the third sensor comprises an optical sensor configured to measure a density of mist in an area proximate the nebulizer, wherein the third data associated with operation of the nebulizer comprises sensed density of mist in the area proximate the nebulizer, and wherein the threshold is indicative of an amount of mist associated with the failure state of the nebulizer; and
wherein determining the existence of the failure state for the nebulizer further comprises determining the third data satisfies the third threshold.

16. A non-transitory computer-readable medium having instructions stored thereon that, upon execution by a computing device, cause the computing device to perform operations comprising:
receiving, from a first sensor, first data associated with operation of a nebulizer;
dynamically determining a threshold indicative of a failure state of the nebulizer, wherein dynamically determining the threshold comprises:
  determining an expected baseline for the first data during operation of the humidifying system; and
  setting a threshold based on the expected baseline for the first data, the threshold corresponding to a rate of change of the first data relative to the baseline;
comparing the first data associated with operation of the nebulizer to the threshold;
in response to the first data associated with the operation of the nebulizer satisfying the threshold, determining existence of the failure state for the nebulizer; and
in response to determination of the existence of the failure state, initiating a remediation action with respect to the nebulizer,
wherein the remediation action comprises modifying pulse modulation of a plurality of nebulizers other than the nebulizer for which the failure state has been determined.

* * * * *